US012644646B2

(12) United States Patent
Kim

(10) Patent No.: US 12,644,646 B2
(45) Date of Patent: Jun. 2, 2026

(54) APPARATUS FOR DRYING ELECTRODE PLATE OF SECONDARY BATTERY

(71) Applicant: SAMSUNG SDI CO., LTD., Yongin-si (KR)

(72) Inventor: Minho Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 19/202,547

(22) Filed: May 8, 2025

(65) Prior Publication Data

US 2026/0078955 A1 Mar. 19, 2026

(30) Foreign Application Priority Data

Sep. 19, 2024 (KR) ........................ 10-2024-0126973

(51) Int. Cl.
*F26B 21/50* (2026.01)
*F26B 21/00* (2026.01)

(52) U.S. Cl.
CPC ............ *F26B 21/50* (2026.01); *F26B 21/001* (2013.01)

(58) Field of Classification Search
CPC ......................... H01M 4/04–0497; D21F 5/18
See application file for complete search history.

(56) References Cited

U.S. PATENT DOCUMENTS 3,096,162 A * 7/1963 Michael .................... D21J 7/00 34/502
4,779,355 A * 10/1988 Petros ..................... F26B 13/10 34/464
4,999,927 A * 3/1991 Durst ...................... F26B 13/10 34/448
6,018,886 A * 2/2000 Bell ...................... F26B 21/004 34/465
10,168,097 B2 * 1/2019 Cerciello ................ F26B 13/14
10,184,717 B2 * 1/2019 Heo ........................ F26B 21/04
11,670,751 B2 * 6/2023 Lee ........................ F26B 21/10 34/337

FOREIGN PATENT DOCUMENTS

CN 208612960 U * 3/2019
CN 211247103 U 8/2020
CN 112344706 A 2/2021
CN 212596874 U 2/2021
CN 216048935 U 3/2022
CN 117084266 A * 11/2023 ............ F26B 21/004

(Continued)

OTHER PUBLICATIONS

Translation of CN-117084266-A (Year: 2023).*

(Continued)

*Primary Examiner* — Jacob J Cigna
(74) *Attorney, Agent, or Firm* — Venable LLP

(57) ABSTRACT

An apparatus for drying an electrode plate of a secondary battery comprises a hot air inlet pipe that includes a torsional structure that is configured to cause rotation hot air for drying an electrode plate coated with a secondary battery electrode material substance or a rolled electrode plate. The apparatus also includes a drying duct that includes hot air ejection ports configured to direct the rotating hot air discharged from the hot air inlet pipe to the electrode plate.

19 Claims, 17 Drawing Sheets

(56) References Cited

FOREIGN PATENT DOCUMENTS

| | | | | | |
|---|---|---|---|---|---|
| CN | 118224855 | A | | 6/2024 | |
| KR | 10-2007-0092385 | A | | 9/2007 | |
| KR | 20150131563 | A | * | 11/2015 | .......... H01M 4/0471 |
| KR | 10-2021-0128721 | A | | 10/2021 | |
| KR | 20240152134 | A | * | 10/2024 | ............ F26B 21/004 |
| WO | 2015/037581 | A1 | | 3/2015 | |

OTHER PUBLICATIONS

Translation of CN-208612960-U (Year: 2019).*
Oct. 24, 2025 Extended European Search Report in counterpart European Patent Application No. 25 178 307.2.

* cited by examiner

FIG. 10B

| CASE | NOZZLE 1 [M/S] | NOZZLE 2 [M/S] | NOZZLE 3 [M/S] | NOZZLE 4 [M/S] | NOZZLE 5 [M/S] | NOZZLE 6 [M/S] | NOZZLE 7 [M/S] | NOZZLE 8 [M/S] | STD [-] | ETC [%] |
|---|---|---|---|---|---|---|---|---|---|---|
| CASE 1 | 2.216 | 2.002 | 2.640 | 5.733 | 5.748 | 2.668 | 2.034 | 2.297 | 0.475 | - |
| CASE 2 | 2.727 | 2.187 | 2.177 | 4.591 | 4.700 | 2.221 | 2.207 | 2.748 | 0.342 | -28 |
| CASE 3 | 2.446 | 2.089 | 2.390 | 3.487 | 3.523 | 2.560 | 2.166 | 2.485 | 0.196 | -59 |

APPARATUS FOR DRYING ELECTRODE PLATE OF SECONDARY BATTERY

CROSS-REFERENCE TO RELATED APPLICATION

The present application claims priority to and the benefit of Korean Patent Application No. 10-2024-0126973, filed on Sep. 19, 2024, in the Korean Intellectual Property Office, the entire disclosure of which is incorporated herein by reference.

BACKGROUND

1. Field of the Disclosure

The present disclosure relates to a secondary battery, and more specifically, to an apparatus for drying a coated and/or rolled electrode plate, a drying duct used with the drying apparatus, and an apparatus for manufacturing an electrode plate of a secondary battery using the drying apparatus.

2. Discussion of Related Art

A secondary battery is a battery that can be charged and discharged, unlike a primary battery that cannot be recharged. In general, a secondary battery includes an electrode assembly that includes of positive and negative electrode plates and a separator. The positive and negative electrode plates may be manufactured through a process of coating a substrate with an active material, followed by processes such as press rolling, drying, slitting, and notching. The electrode assembly is formed by winding laminating the positive and negative electrode plates together with a separator.

A process of manufacturing the secondary battery may include coating one side or both sides of an electrode substrate with an active material mixture, and a rolling process of compressing and stretching an electrode plate coated with a mixture in the coating process with a roller to make the electrode plate thin and flat and to improve the density and allow lithium ions to move smoothly. Such processing increases the output and performance of the secondary battery.

A drying unit may be used for drying the electrode plate that has undergone the coating process and/or the rolling process. The drying unit directs hot air to an electrode plate coated with slurry. The hot air is spread over a wide area through a large number of perforated holes of a perforated plate to dry a solvent component in the slurry that has been coated the electrode plate.

The information disclosed in this section is for enhancement of understanding of the background of the present disclosure and it may contain information that does not constitute a related (or prior) art.

SUMMARY OF THE DISCLOSURE

The present disclosure is directed to improving the hot air dispersibility of a drying duct included in a drying apparatus to make hot air uniform so that uniform drying of the electrode plate can be achieved.

According to an aspect of the present disclosure, there is provided an apparatus for drying an electrode plate of a secondary battery, with the apparatus comprising a hot air inlet pipe that includes a torsional structure configured to cause rotation of hot air for drying an electrode plate coated with a secondary battery electrode material substance or a rolled electrode plate, and a drying duct that includes hot air ejection ports configured to direct the rotating hot air discharged from the hot air inlet pipe to the electrode plate.

According to another aspect of the present disclosure, there is provided a drying duct for drying an electrode plate of a secondary battery, with the drying duct including a hot air inlet pipe that includes a torsional structure configured to cause rotation of hot air for drying an electrode plate coated with a secondary battery electrode material substance or a rolled electrode plate, and hot air ejection ports configured to direct the rotating hot air discharged from the hot air inlet pipe to the electrode plate.

According to another aspect of the present disclosure, there is provided an apparatus for manufacturing an electrode plate of a secondary battery, which includes a coating unit configured to coat a substrate with an electrode material substance, a rolling unit configured to compress an electrode plate coated with the electrode material substance, and a drying unit configured to dry the electrode plate coated with the electrode material substance or the rolled electrode plate, in which the drying unit includes a hot air inlet pipe that includes a torsional structure that configured to cause rotation of hot air and hot air ejection ports configured to direct the rotating hot air discharged from the hot air inlet pipe to the electrode plate.

Aspects and features of the present disclosure are not limited to those described above, and other aspects and features not specifically mentioned herein will be clearly understood by those skilled in the art from the description of the present disclosure below.

BRIEF DESCRIPTION OF THE DRAWINGS

The drawings attached to the present specification illustrate embodiments of the present disclosure and further describe aspects and features of the present disclosure together with the detailed description of the present disclosure. The present disclosure should not be construed as being limited to the drawings, in which:

FIGS. 10A and 10B are diagrams for describing a simulation of quantitative comparison of flow rate distribution;

DETAILED DESCRIPTION OF EXEMPLARY EMBODIMENTS

Figure 1:
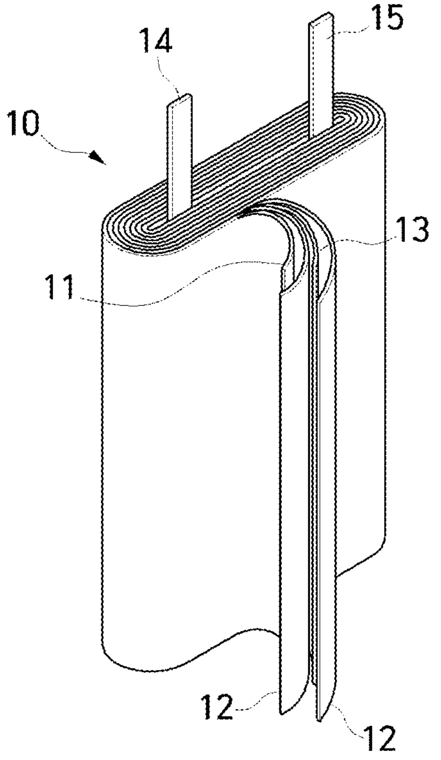
FIG. 1 is a schematic diagram of an electrode assembly of a secondary battery.

Hereinafter, embodiments of the present disclosure will be described, in detail, with reference to the accompanying drawings. The terms or words used in the present specification and claims are not to be narrowly interpreted according to their general or dictionary meanings and should be interpreted as having meanings and concepts that are consistent with the technical idea of the present disclosure on the basis of the principle that an inventor can be his/her own lexicographer to appropriately define concepts of terms to describe his/her invention in the best way.

The embodiments described in this specification and the configurations shown in the drawings are only some embodiments of the present disclosure and do not represent all of the aspects, features, and embodiments of the present disclosure. Accordingly, it should be understood that there may be various equivalents and modifications that can replace or modify one or more embodiments or features therein described herein at the time of filing this application.

It will be understood that if an element or layer is referred to as being “on,” “connected to,” or “coupled to” another element or layer, it may be directly on, connected, or coupled to the other element or layer or one or more intervening elements or layers may also be present. When an element or layer is referred to as being “directly on,” “directly connected to,” or “directly coupled to” another element or layer, there are no intervening elements or layers present. For example, if a first element is described as being “coupled” or “connected” to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term “and/or” includes any and all combinations of one or more of the associated listed items. Further, the use of “may” if describing embodiments of the present disclosure relates to “one or more embodiments of the present disclosure.” Expressions, such as “at least one of” and “any one of,” if preceding a list of elements, modify the entire list of elements and do not modify the individual elements of the list. When phrases such as “at least one of A, B and C, “at least one of A, B or C,” “at least one selected from a group of A, B and C,” or “at least one selected from among A, B and C” are used to designate a list of elements A, B and C, the phrase may refer to any and all suitable combinations or a subset of A, B and C, such as A, B, C, A and B, A and C, B and C, or A and B and C. As used herein, the terms “use,” “using,” and “used” may be considered synonymous with the terms “utilize,” “utilizing,” and “utilized,” respectively. As used herein, the terms “substantially,” “about,” and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as “beneath,” “below,” “lower,” “above,” “upper,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” or “beneath” other elements or features would then be oriented “above” or “over” the other elements or features. Thus, the term “below” may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms “a” and “an” are intended to include the plural forms as well, unless the context clearly indicates otherwise. It will be further understood that the terms “includes,” “including,” “comprises,” and/or “comprising,” if used in this specification, specify the presence of stated features, integers, steps, operations, elements, and/or components but do not preclude the presence or addition of one or more other features, integers, steps, operations, elements, components, and/or groups thereof.

Numerical ranges disclosed and/or recited herein include all sub-ranges of the same numerical precision subsumed within the recited range. For example, a range of “1.0 to 10.0” includes all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein includes all lower numerical limitations subsumed therein, and any minimum numerical limitation recited in this specification includes all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

References to two compared elements, features, etc. as being “the same” may mean that they are “substantially the same." Thus, the phrase "substantially the same" may include a case having a deviation that is considered low in the art, for example, a deviation of 5% or less. In addition, if a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may contact the upper (or lower) surface of the element, and another element may also be interposed between the element and the arbitrary element located on (or under) the element.

In addition, it will be understood that if a component is referred to as being "linked," "coupled," or "connected" to another component, the elements may be directly "coupled," "linked" or "connected" to each other, or another component may be "interposed" between the components."

Throughout the specification, if "A and/or B" is stated, it means A, B or A and B, unless otherwise stated. That is, "and/or" includes any or all combinations of a plurality of items enumerated. When "C to D" is stated, it means C or more and D or less, unless otherwise specified.

The terminology used herein is for the purpose of describing embodiments of the present disclosure and is not intended to limit the present disclosure.

FIG. 1 shows an electrode assembly 10 of a secondary battery.

The electrode assembly 10 may be formed by winding or stacking a stack of a first electrode plate 11, a separator 12, and a second electrode plate 13, each of which are formed as thin plates or films. When the electrode assembly 10 is a wound stack, a winding axis may be parallel to the longitudinal direction of a case of the secondary battery. In other embodiments, the electrode assembly 10 may be a stack type rather than a winding type, and the shape of the electrode assembly 10 is not limited in the present disclosure. In addition, the electrode assembly 10 may be a Z-stack electrode assembly in which a positive electrode plate and a negative electrode plate are provided to both sides (e.g., opposite sides) of a separator, which is then bent (or folded) into a Z-stack. In addition, one or more electrode assemblies may be stacked (e.g., arranged) such that long sides of the electrode assemblies are adjacent to each other and accommodated in a case. The number of electrode assemblies in a case is not limited in the present disclosure. The first electrode plate 11 of the electrode assembly may act as a negative electrode, and the second electrode plate 13 may act as a positive electrode. Of course, the reverse is also possible.

The first electrode plate 11 may be formed by applying (e.g., coating or depositing) a first electrode active material, such as graphite or carbon, onto a first electrode substrate formed of a metal foil, such as copper, a copper alloy, nickel, or a nickel alloy. The first electrode plate 11 may include a first electrode tab 14 (e.g., a first uncoated portion), which is a region to which the first electrode active material is not provided. The first electrode tab 14 may be connected to an external first terminal. In some embodiments, when the first electrode plate 11 is made, the first electrode tab 14 may be formed by cutting such that the first electrode tab 14 protrude to from one side of the electrode assembly 10, or the first electrode tab 14 may protrude from a side of the electrode assembly 10 more than (e.g., farther than or beyond) the separator 12 without being separately cut.

The second electrode plate 13 may be formed by applying (e.g., coating or depositing) a second electrode active material, such as a transition metal oxide, onto a second electrode substrate formed of a metal foil, such as aluminum or an aluminum alloy. The second electrode plate 13 may include a second electrode tab 15 (e.g., a second uncoated portion), which is a region to which the second electrode active material is not provided. The second electrode tab 15 may be connected to an external second terminal. In some embodiments, the second electrode tab 15 may be formed by cutting to protrude from the other side (e.g., the opposite side) of the electrode assembly 10 when the second electrode plate 13 is made. In other embodiments, the second electrode plate 13 may protrude to the other side of the electrode assembly more than (e.g., farther than or beyond) the separator 12 without being separately cut.

The separator 12 prevents a short-circuit between the first electrode plate 11 and the second electrode plate 13 while allowing movement of lithium ions therebetween. The separator 12 may be made of, for example, a polyethylene film, a polypropylene film, a polyethylene-polypropylene film, or the like.

In some embodiments, the electrode assembly 10 may be accommodated in a case along with an electrolyte. In a pouch-type secondary battery, an electrode assembly 10 may be accommodated in a flexible pouch. In a cylindrical or prismatic secondary battery, an electrode assembly 10 may be accommodated in a cylindrical or prismatic metal casing.

Hereinafter, suitable materials that may be usable for the secondary battery according to embodiments of the present disclosure will be described.

As the positive electrode active material, a compound capable of reversibly intercalating/deintercalating lithium (e.g., a lithiated intercalation compound) may be used. For example, at least one of a composite oxide of lithium and a metal selected from cobalt, manganese, nickel, and combinations thereof may be used.

The composite oxide may be a lithium transition metal composite oxide, and examples thereof may include a lithium nickel-based oxide, a lithium cobalt-based oxide, a lithium manganese-based oxide, a lithium iron phosphate-based compound, a cobalt-free nickel-manganese-based oxide, or a combination thereof. As examples, a compound represented by any one of the following formulas may be used: $Li_aA_{1-b}X_bO_{2-c}D_c$ ($0.90 \le a \le 1.8$, $0 \le b \le 0.5$, $0 \le c \le 0.05$); $Li_aMn_{2-b}X_bO_{4-c}D_c$ ($0.90 \le a \le 1.8$, $0 \le b \le 0.5$, $0 \le c \le 0.05$); $Li_aNi_{1-b-c}Co_bX_cO_{2-\alpha}D_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}D_\alpha$ ($0.90 \le a \le 1.8$, $0 \le b \le 0.5$, $0 \le c \le 0.5$, $0 < \alpha < 2$); $Li_aNi_bCo_cL^1_dG_eO_2$ ($0.90 \le a \le 1.8$, $0 \le b \le 0.9$, $0 \le c \le 0.5$, $0 \le d \le 0.5$, $0 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $Li_{(3-f)}Fe_2(PO_4)_3$ ($0 \le f \le 2$); and $Li_aFePO_4$ ($0.90 \le a \le 1.8$). In these formulas A is Ni, Co, Mn, or a combination thereof; X is Al, Ni, Co, Mn, Cr, Fe, Mg, Sr, V, a rare earth element, or a combination thereof; D is O, F, S, P, or a combination thereof; G is Al, Cr, Mn, Fe, Mg, La, Ce, Sr, V, or a combination thereof; and $L^1$ is Mn, Al, or a combination thereof.

A positive electrode for a lithium secondary battery may include a substrate and a positive electrode active material layer formed on the substrate. The positive electrode active material layer may include a positive electrode active material and may further include a binder and/or a conductive material.

The amount of the positive electrode active material may be in a range of about 90 wt % to about 99.5 wt % based on 100 wt % of the positive electrode active material layer, and the amount of the binder and the conductive material may be in a range of about 0.5 wt % to about 5 wt %, respectively, based on 100 wt % of the positive electrode active material layer.

The substrate may be aluminum (Al) but is not limited thereto.

The negative electrode active material may include a material capable of reversibly intercalating/deintercalating lithium ions, lithium metal, an alloy of lithium metal, a material capable of being doped and undoped with lithium, or a transition metal oxide.

The material capable of reversibly intercalating/deintercalating lithium ions may be a carbon-based negative electrode active material, which may include, for example, crystalline carbon, amorphous carbon, or a combination thereof. Examples of the crystalline carbon include graphite, such as natural graphite or artificial graphite, and examples of the amorphous carbon include soft carbon, hard carbon, a pitch carbide, a meso-phase pitch carbide, sintered coke, and the like.

A Si-based negative electrode active material or a Sn-based negative electrode active material may be used as the material capable of being doped and undoped with lithium. The Si-based negative electrode active material may be silicon, a silicon-carbon composite, $SiO_x$ ($0<x<2$), a Si-based alloy, or a combination thereof.

The silicon-carbon composite may be a composite of silicon and amorphous carbon. According to an embodiment, the silicon-carbon composite may be in the form of silicon particles with amorphous carbon coated on the surfaces of the silicon particles.

The silicon-carbon composite may further include crystalline carbon. For example, the silicon-carbon composite may include a core including crystalline carbon and a silicon particle and an amorphous carbon coating layer on the surface of the core.

A negative electrode for a lithium secondary battery may include a substrate and a negative electrode active material layer disposed on the substrate. The negative electrode active material layer may include a negative electrode active material and may further include a binder and/or a conductive material.

The negative electrode active material layer may include about 90 wt % to about 99 wt % of a negative electrode active material, about 0.5 wt % to about 5 wt % of a binder, and about 0 wt % to about 5 wt % of a conductive material.

A non-aqueous binder, an aqueous binder, a dry binder, or a combination thereof may be used as the binder. When an aqueous binder is used as the negative electrode binder, a cellulose-based compound capable of imparting viscosity may be further included.

As the negative electrode substrate, one of copper foil, nickel foil, stainless steel foil, titanium foil, nickel foam, copper foam, conductive metal-coated polymer substrate, and combinations thereof may be used.

An electrolyte for a lithium secondary battery may include a non-aqueous organic solvent and a lithium salt. The non-aqueous organic solvent acts as a medium through which ions involved in the electrochemical reaction of the battery can move. The non-aqueous organic solvent may be a carbonate-based, an ester-based, an ether-based, a ketone-based, an alcohol-based solvent, an aprotic solvent, and may be used alone or in combination of two or more. In addition, when a carbonate-based solvent is used, a mixture of cyclic carbonate and chain carbonate may be used.

Depending on the type of lithium secondary battery, a separator may be present between the first electrode plate (e.g., the negative electrode) and the second electrode plate (e.g., the positive electrode). As the separator, polyethylene, polypropylene, polyvinylidene fluoride, or a multilayer film including two or more layers thereof may be used.

The separator may include a porous substrate and a coating layer including an organic material, an inorganic material, or a combination thereof on one or both surfaces of the porous substrate.

The organic material may include a polyvinylidene fluoride-based polymer or a (meth)acrylic polymer.

The inorganic material may include inorganic particles selected from $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, and combinations thereof. but the present disclosure is not limited to these examples.

The organic material and the inorganic material may be mixed in a coating layer or may be in the form of a coating layer including (or containing) an organic material and a coating layer including (or containing) an inorganic material that are stacked on each other.

Figure 2:
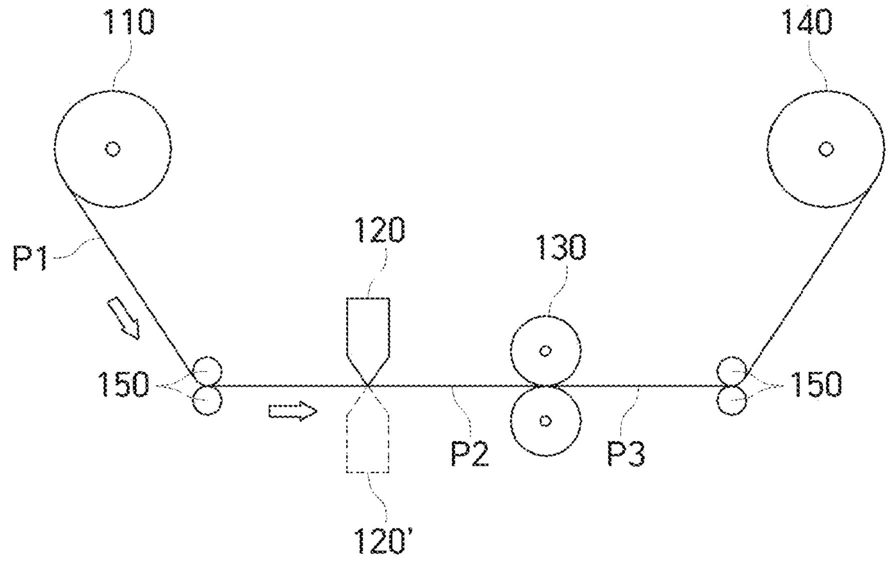
FIG. 2 is a schematic diagram of a process of manufacturing an electrode plate of the electrode assembly illustrated in FIG. 1.

FIG. 2 is a schematic diagram of a process of manufacturing the first electrode plate 11 or the second electrode plate 13 of the electrode assembly 10 illustrated in FIG. 1.

A supply roll 110 is provided on which a substrate P1 for an electrode plate is wound. When an apparatus for manufacturing electrode plates according to the present disclosure is used to manufacture a positive electrode plate, the substrate P1 may be, for example a metal foil containing aluminum (Al). Alternatively, when the apparatus for manufacturing electrode plates according to the present disclosure is used to manufacture a negative electrode plate, the substrate P1 may be, for example, a metal foil containing copper (Cu) or nickel (Ni).

Figure 5:
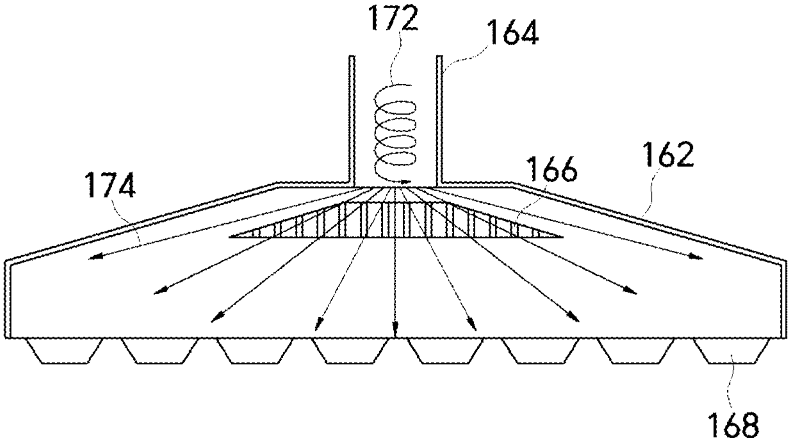
FIG. 5 is a side view of a drying unit according to embodiments of the present disclosure.

A transfer roller 150 may be provided as an idle roller that guides the substrate P1 unwounded from the supply roll 110 or as a drive roller that applies a pulling force to unwind the substrate P1 from the supply roll 110. FIG. 5 illustrates a total of four transfer rollers 150 as an example, but the number and positions of transfer rollers is not limited to the depicted configuration.

A coating unit 120 forms a coating layer by coating the substrate P1 with an electrode material slurry. It is possible to simultaneously coat the upper and lower surfaces of the substrate P1 by adding a second coating unit 120', which has the same configuration as the coating unit 120 illustrated in FIG. 5. In such a case, the second coating unit 120' is configured to coat the lower surface of the substrate P1.

A press unit 130, i.e., a rolling unit, uses a roller to compresses an electrode plate P2 coated with the slurry (mixture) by the coating unit 120. Such pressing enables the production of high-capacity and high-density secondary batteries.

A winding roll 140 winds and accommodates an electrode plate P3 coated and rolled by the coating unit 120 and the press unit 130.

When manufacturing the electrode plate, a process for drying the liquid component contained in the slurry may be required. In this drying process, a drying unit is used to dry the electrode plate by blowing hot air through a drying duct. The drying process may be performed after the electrode plate coating process and/or after the rolling process.

Figure 3:
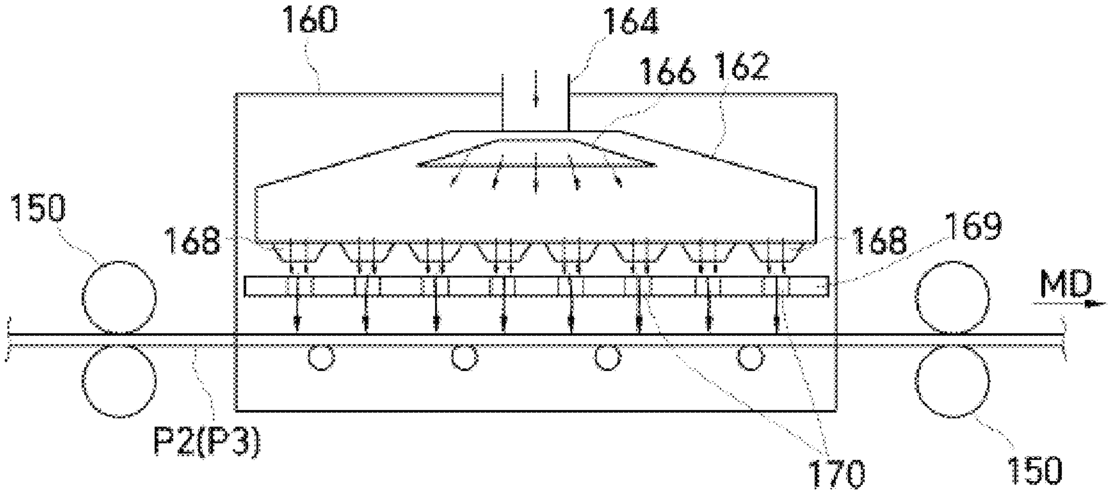
FIG. 3 is a side view of an electrode plate drying unit according to some embodiments of the present disclosure.
Figure 4:
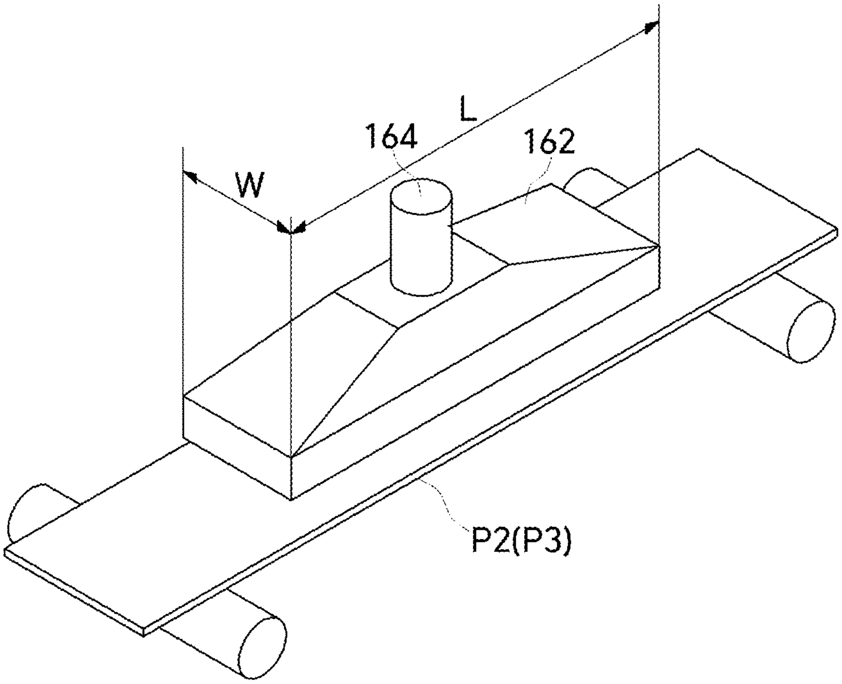
FIG. 4 is a perspective view from above the electrode plate drying unit of FIG. 3.

FIG. 3 is a schematic diagram of an electrode plate drying unit (e.g., a drying furnace). FIG. 4 is a perspective view of an upper portion of the electrode plate drying unit of FIG. 3.

The coated and/or rolled electrode plate P2 or P3 transported in an MD direction by a transfer roller 150 enters a drying chamber 160 and is dried. A drying duct 162 is provided in the drying chamber 160 to direct drying air (e.g., hot air) to the electrode plate. The drying duct 162 has a shape similar to a trapezoid when viewed from the side and includes a distribution plate 166 that widely distributes the drying air that enters through an inlet pipe 164 at the top and ejection ports and nozzles 168 that direct distributed hot air downward. A perforated plate 169 with air holes 170 that further distributes the hot air and directs the hot air onto the electrode plate may be added to a lower portion of the ejection ports 168.

As shown in FIG. 4, in order to widely distribute a flow of hot air within the drying chamber 160, the drying duct 162 is generally made in a flat shape with a large aspect ratio, that is, a ratio of length L to width W. Therefore, even when the distribution plate 166 and the perforated plate (not shown) are used and the ejection ports 168 are provided over an entire lower area of the drying duct 162, the drying duct 162 has a structure that makes it difficult to evenly distribute the hot air to edges and corners of the internal space of the drying duct 162. When the flow of hot air is not evenly distributed, the electrode plate located below the drying duct 162 cannot be evenly dried, and thus the drying performance thereof is inevitably degraded. Therefore, an additional method to widely distribute the flow of hot air is needed.

Figure 6:
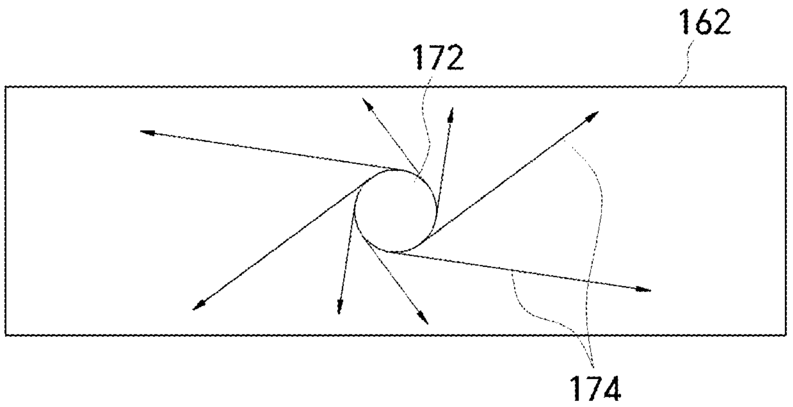
FIG. 6 is a plan view of a drying unit according to embodiments of the present disclosure.

FIG. 5 is a side view of the drying duct 162 according to embodiments of the present disclosure. FIG. 6 is a plan view of the drying duct 162.

In FIG. 5, hot air flowing into the hot air inlet pipe 164 at the top of the drying duct 162 is converted into rotating wind 172 inside the inlet pipe 164. In a conventional case as shown in FIG. 3, hot air flows linearly into the inlet pipe 164, is distributed while passing through the distribution plate 166, and then is ejected through the ejection ports 168. However, according to the present disclosure, as shown in FIG. 5, hot air is initially made to rotate in the inlet pipe 164 and then flows to the inside of the drying duct 162. The rotating hot air 172 rotates with a strong force within the space of the drying duct 162 and may reach end portions of the internal space of the drying duct 162. The reference numeral 174 represents hot air spreads out in the space inside the drying duct.

In the plan view of FIG. 6 it can be seen that the rotating wind 172 converted from the hot air in the inlet pipe 164 may rotate in the internal space of the drying duct 162 and reach end corners of the internal space with a strong rotational force. The dispersing force of the rotating wind 172 generated in the inlet pipe 164 may be further strengthened by the distribution plate 166.

Converting the hot air that enters the inlet pipe 164 to the rotating hot air 172 may be achieved by providing a torsional structure inside the inlet pipe 164.

Figure 7:
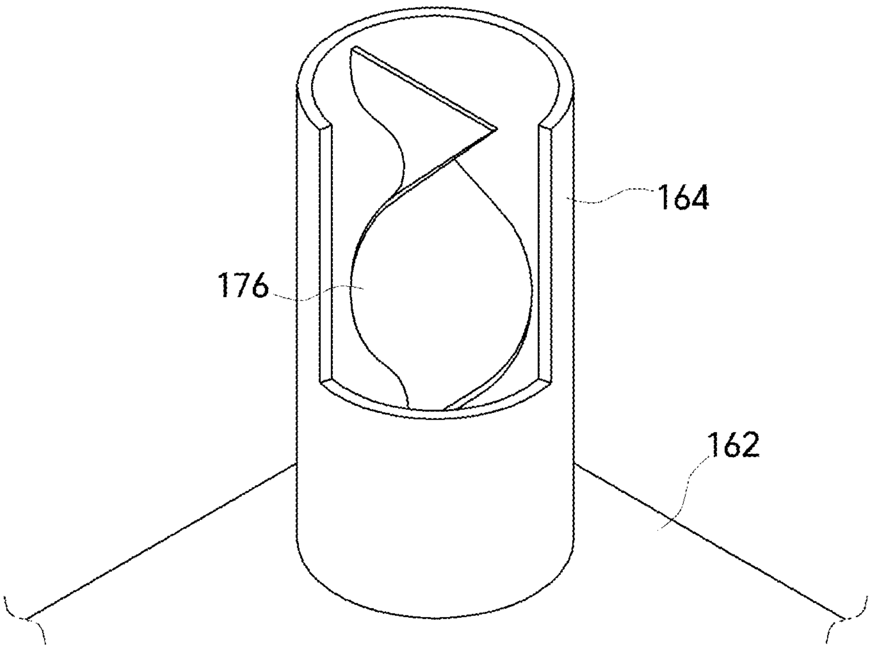
FIG. 7 is a diagram of the interior of a hot air inlet pipe according to embodiments.
Figure 8:
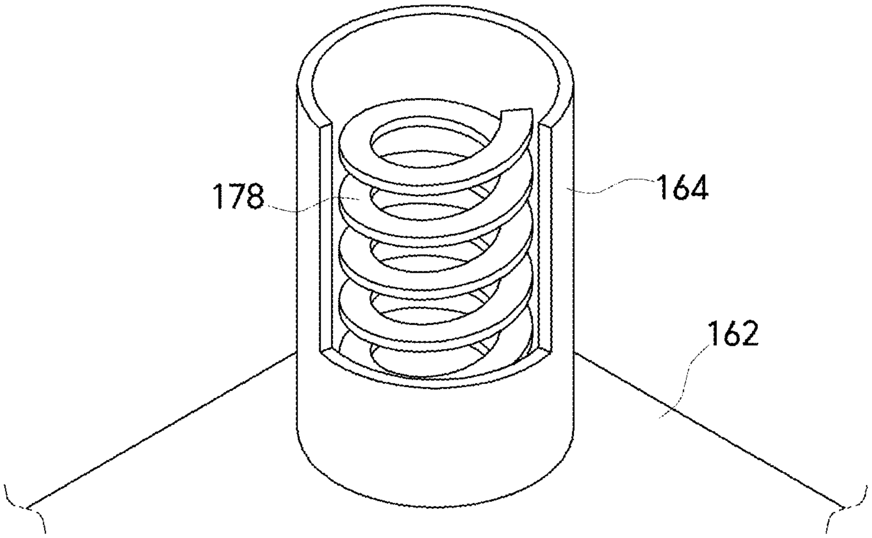
FIG. 8 is a diagram of the interior of a hot air inlet pipe according to other embodiments.

FIGS. 7 and 8 show the interior of the hot air inlet pipe 164 according to embodiments of the present disclosure. A torsional structure is installed inside the inlet pipe 164. The torsional structure may be implemented as a twisted-tape structure or a helical structure.

FIG. 7 shows an embodiment in which a torsional structure is implemented as the twisted-tape structure 176. The twisted tape 176 is provided in the hot air inlet pipe 164, and hot air flowing into the hot air inlet pipe 164 may be generated as the rotating hot air 172 along a shape trajectory formed by the twisted tape 176.

The twisted tape 176 may be made by twisting a plate having a width equal to a diameter of the hot air inlet pipe 164. To make the twisted tape 176, at least one (e.g., two to four) plate having a width approximately equal to the diameter of the hot air inlet pipe 164 may be used.

The twisted tape 176 may be made with a twist period of approximately 2 to 4 times the diameter of the hot air inlet pipe 164, and the twisted tape 176 may be made with approximately 1 to 3 twists in the inlet pipe 164. The twisted tape 176 shown in FIG. 7 has two twists.

FIG. 8 shows an embodiment in which a torsional structure is implemented as a helical structure. A helical plate 178 is positioned in the hot air inlet pipe 164, and hot air flowing into the inlet pipe 164 may be generated as the rotating hot air 172 along a spiral trajectory formed by the helical plate 178.

The helical plate 178 may be made in a spiral shape by a press method or a winding metho, using a plate having a width equal to or smaller than a radius of the hot air inlet pipe 164. Similar to the twisted tape 176, the spiral period of the helical plate 178 may be approximately 2 to 4 times the diameter of the hot air inlet pipe 164, but a smaller spiral period (e.g., a spiral period equal to or less than the diameter of the inlet pipe 164) may also be used (see FIG. 8). Similar to the twisted tape 176, the helical plate 178 may also be made with approximately 1 to 3 spirals, but is not limited thereto. For example, in FIG. 8, the helical plate 178 has approximately 5 spirals along the length of the hot air inlet pipe 164. Thus, the helical plate 178 may be manufactured to have a spiral period of approximately 1 to 4 times the diameter of the hot air inlet pipe 164 and a rotation number of approximately 1 to 5.

Figure 9:
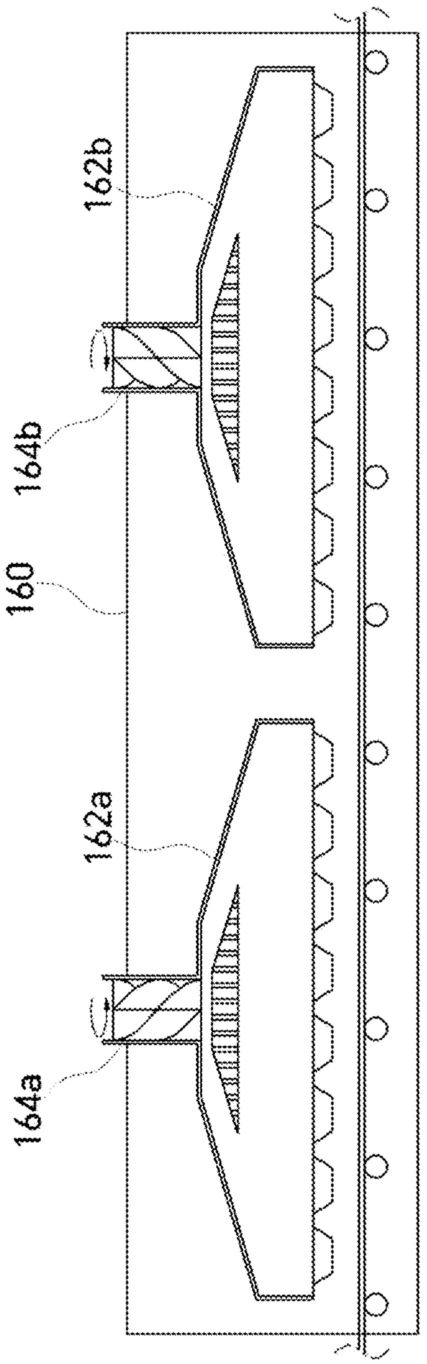
FIG. 9 is a diagram of an apparatus for drying an electrode plate in which two drying ducts are used in a drying chamber.

FIG. 9 shows an apparatus for drying an electrode plate in which two drying ducts 162 are provided in the drying chamber 160. In this embodiment, a first drying duct 162*a* and a second drying duct 162*b* are generally provided side by side in a horizontal direction. In order to efficiently distribute the hot air, it may be advantageous to install a torsional structure in an inlet pipe 164*a* of the first drying duct 162*a* and a torsional structure in an inlet pipe 164*b* of the second drying duct 162*b* so that rotational directions of the inlet pipes 164*a* and 164*b* are opposite to each other, and generate rotating hot air in opposite directions.

<Computer Simulation> Quantitative Comparison of Flow Rate Distribution

Figure 10A:
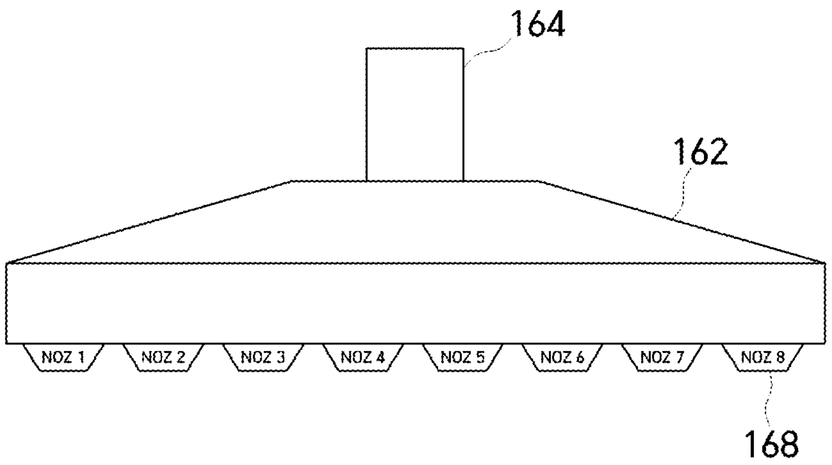

With reference to FIG. 10A, a case where the torsional structure described above was provided in the hot air inlet pipe 164 a case where the torsional structure was not provided in the hot air inlet pipe 164 of the drying duct 162 having eight ejection ports 168 (NOZ1 to NOZ8) were tested. Also tested were cases where the distribution plate 166 of FIG. 3 was used or was not used. In the tests, a flow velocity of the hot air from the ejection ports 168 at the lower portion of the drying duct 162 was measured to quantitatively compare the flow rate distribution performance of the drying duct 162 in each case.

As shown in FIG. 10B, a flow velocity [m/s] of the hot air from each of the nozzles NOZ1 to NOZ8 was measured, and the standard deviation (Std) was calculated and compared to quantitatively compare the dispersibility of hot air for each flow velocity. FIG. 10B shows flow rate measurements and standard deviations for the drying duct 162 for Case 1, which corresponds to a case where the distribution plate 166 is not present and a torsional structure is not present, Case 2, which corresponds to a case where the distribution plate 166 is present and a torsional structure is not present, and Case 3, which corresponds to a case where the distribution plate 166 is present and a torsional structure is present. Case 1 was set as a base case.

In the case where the distribution plate 166 is present (Case 2), it can be confirmed that a standard deviation value is reduced by approximately 28% and the dispersibility of the flow is improved. In the case where both the distribution plate 166 and the torsional structure are present (Case 3), it can be confirmed that the standard deviation value is reduced by approximately 59% and the dispersibility of the flow is further improved.

Figure 11A:
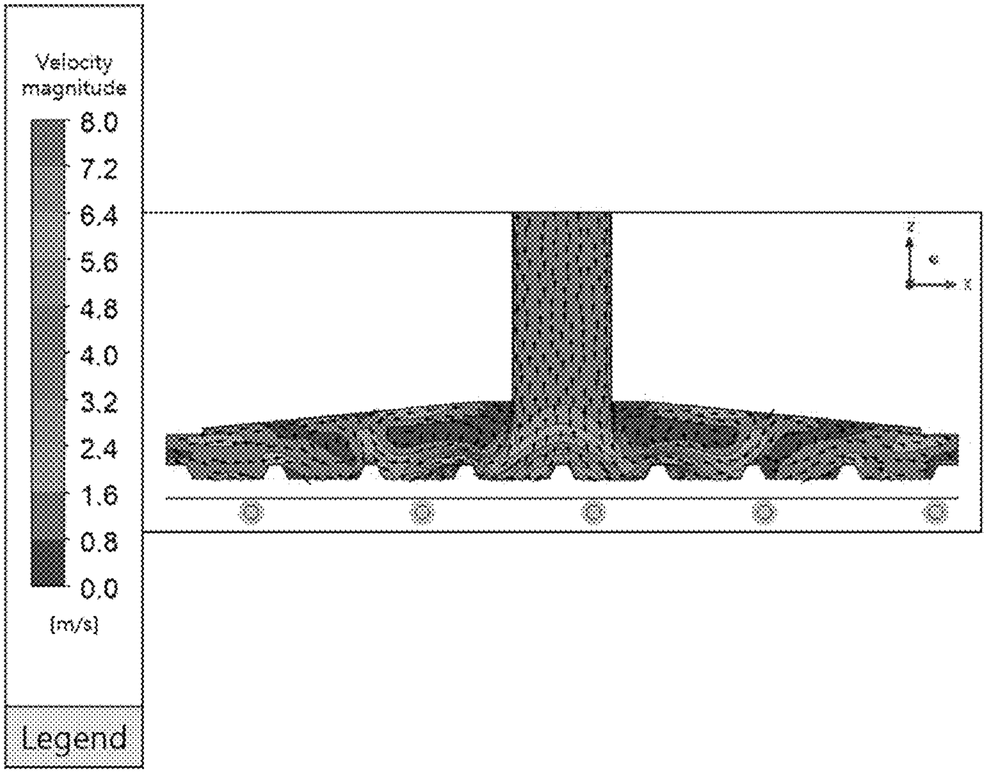
FIGS. 11A to 11C are diagrams for describing a simulation of comparison of a flow field and vector field distribution within a drying duct.
Figure 11B:
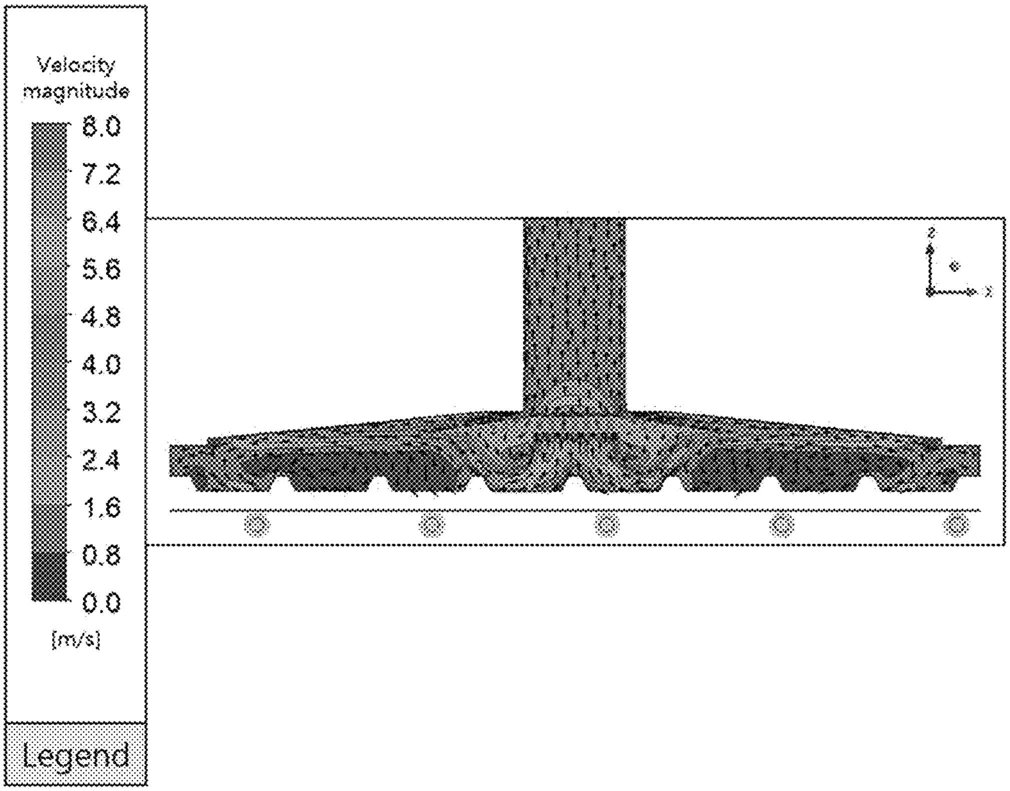
Figure 11C:
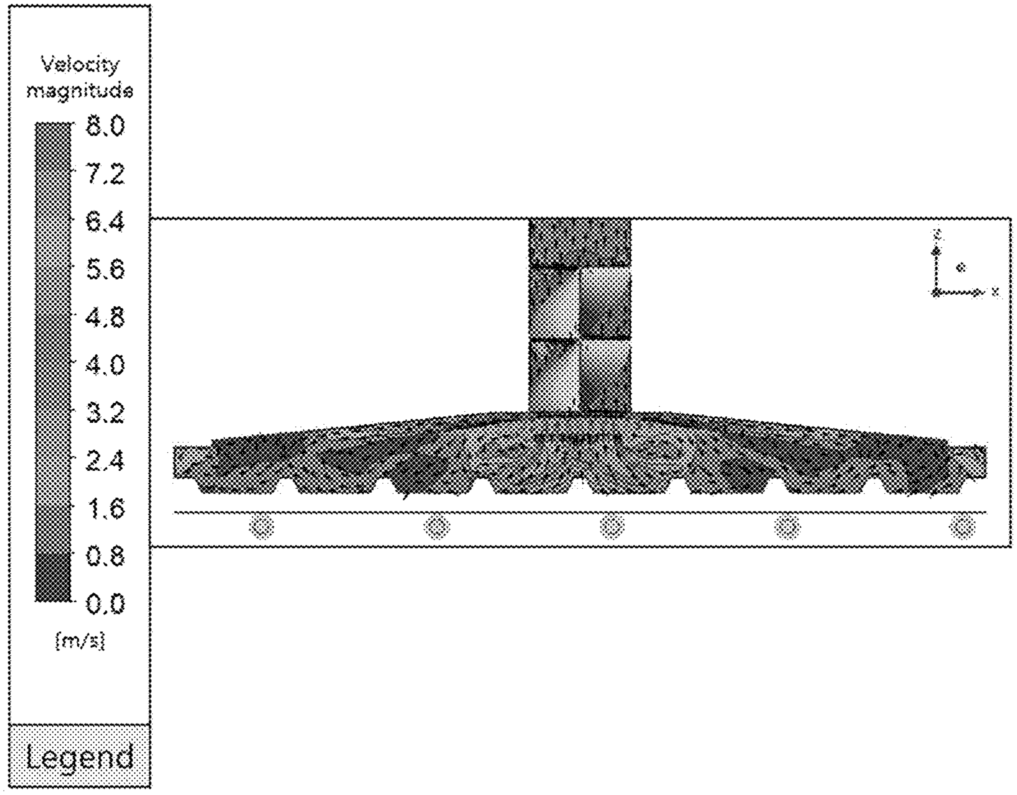

Flow field and vector field distribution within a drying duct 162 were compared and the results are shown in FIGS. 11A-11C. Case 1 is shown in FIG. 11A, which shows a flow pattern where the main stream of the flow is concentrated toward a central portion of the drying duct. Case 2 is shown FIG. 11B, which shows a flow pattern where the main stream is partially distributed by the distribution plate, but a significant amount of the flow pattern is concentrated toward the central portion. Case 3 is shown FIG. 11C, which shows that a flow pattern in which a flow velocity of downward flow in the central portion of the drying duct is slightly reduced and the dispersibility of the flow within the duct space is nearly uniform.

Figure 12A:
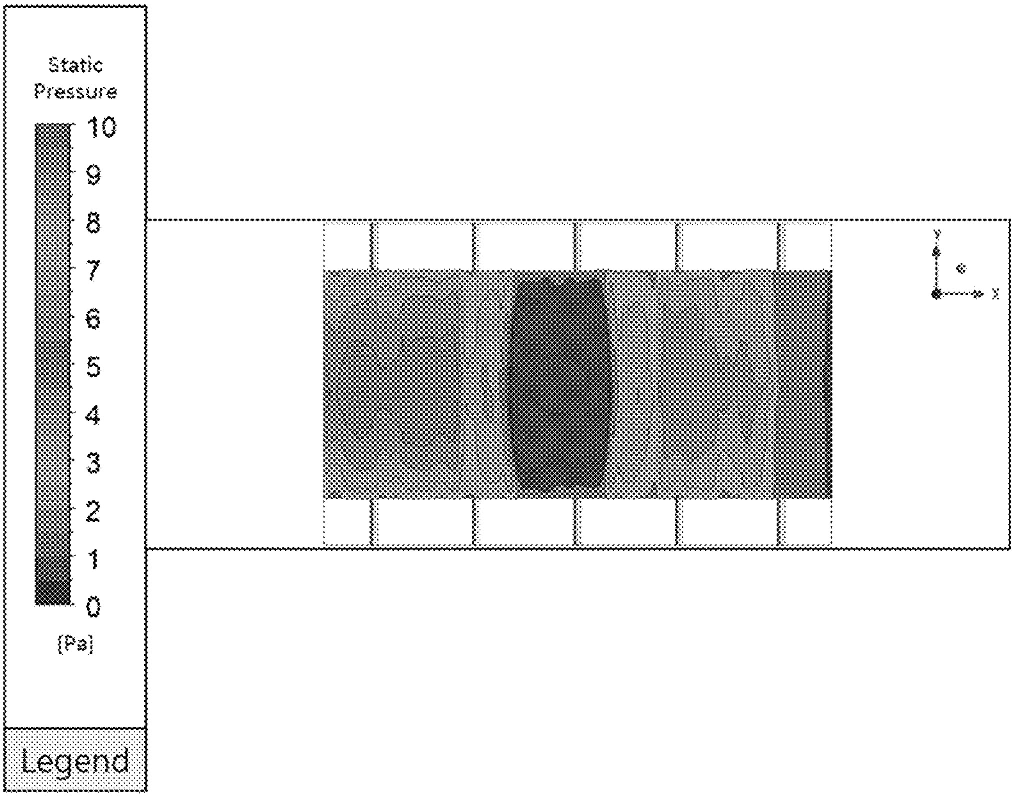
FIGS. 12A to 12C are diagrams for describing a simulation of comparison of a flow field and vector field distribution within a drying duct.
Figure 12B:
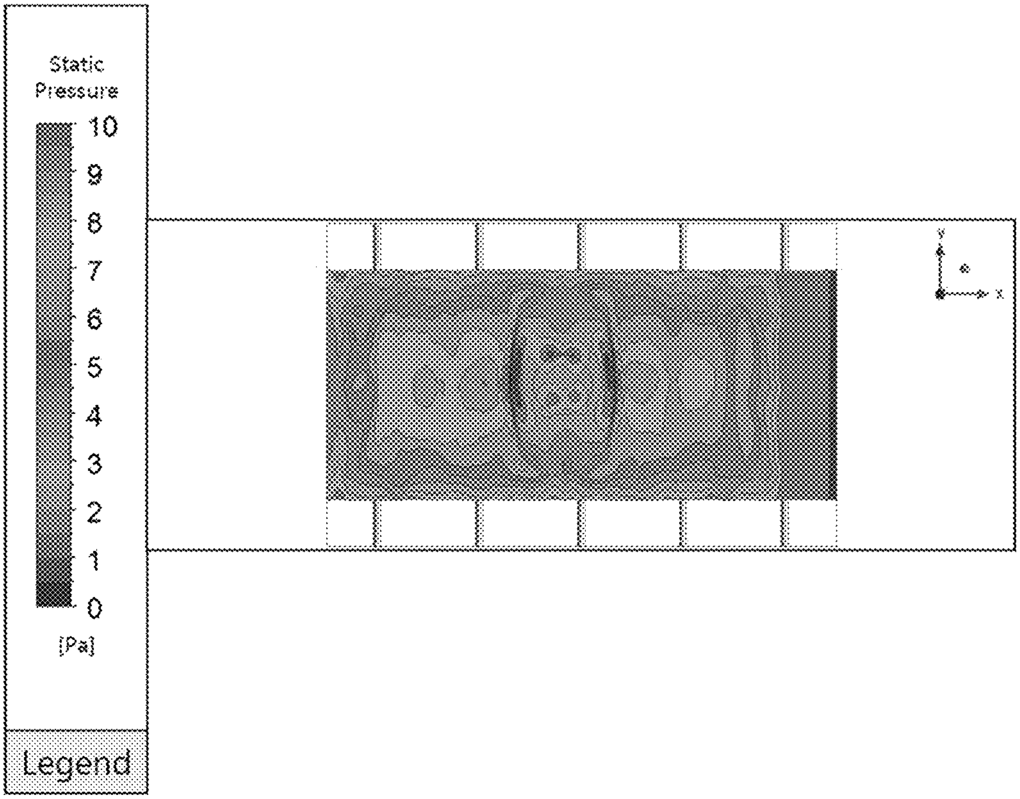
Figure 12C:
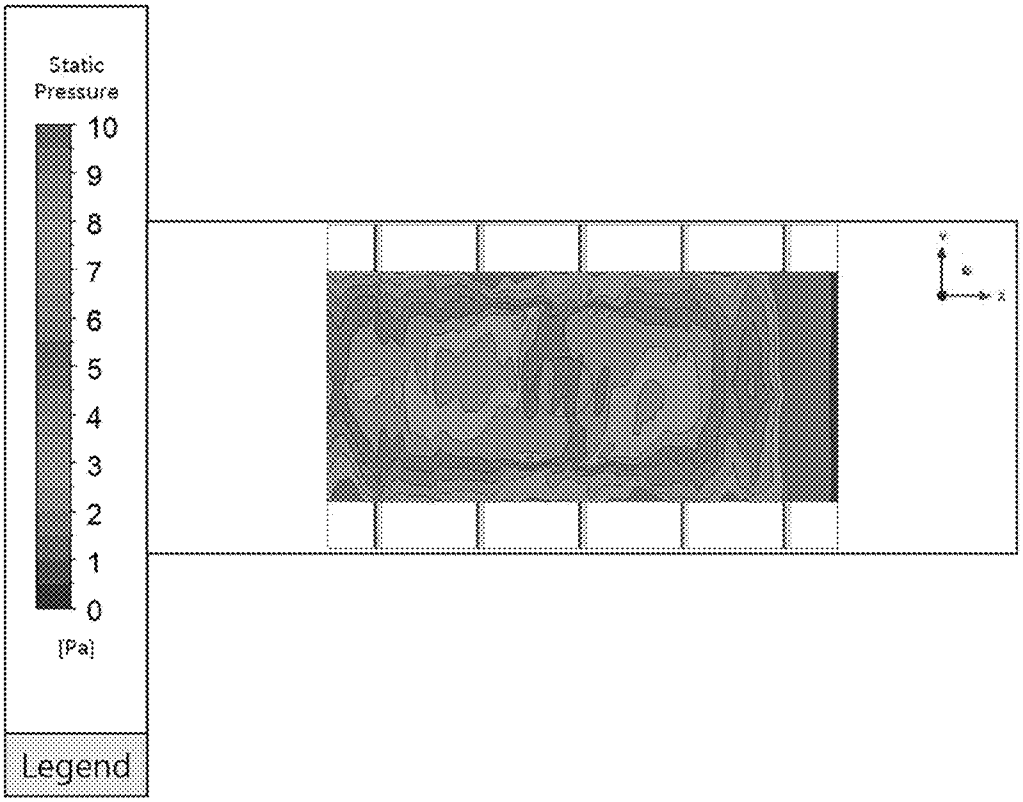

The pressure field distribution over an electrode plate was compared and the results are shown in FIGS. 12A-12C. Case 1 is shown in FIG. 12A, which shows a relatively low pressure distribution because the flow barely reaches the electrode plate located below the central nozzles (NOZ4 and NOZ5 in FIG. 10A). Case 2 is shown in FIG. 12B, although pressure distribution is improved as compared to Case 1, since the flow ejected toward the lower side of the central nozzles is reduced, there is still a relatively low pressure distribution. Case 3 is shown in FIG. 12C, wherein it can be seen that the phenomenon in which a low pressure distribution appears at the central portion of the electrode plate is alleviated, and, thus, a relatively high pressure distribution is present at the central portion.

Figure 13:
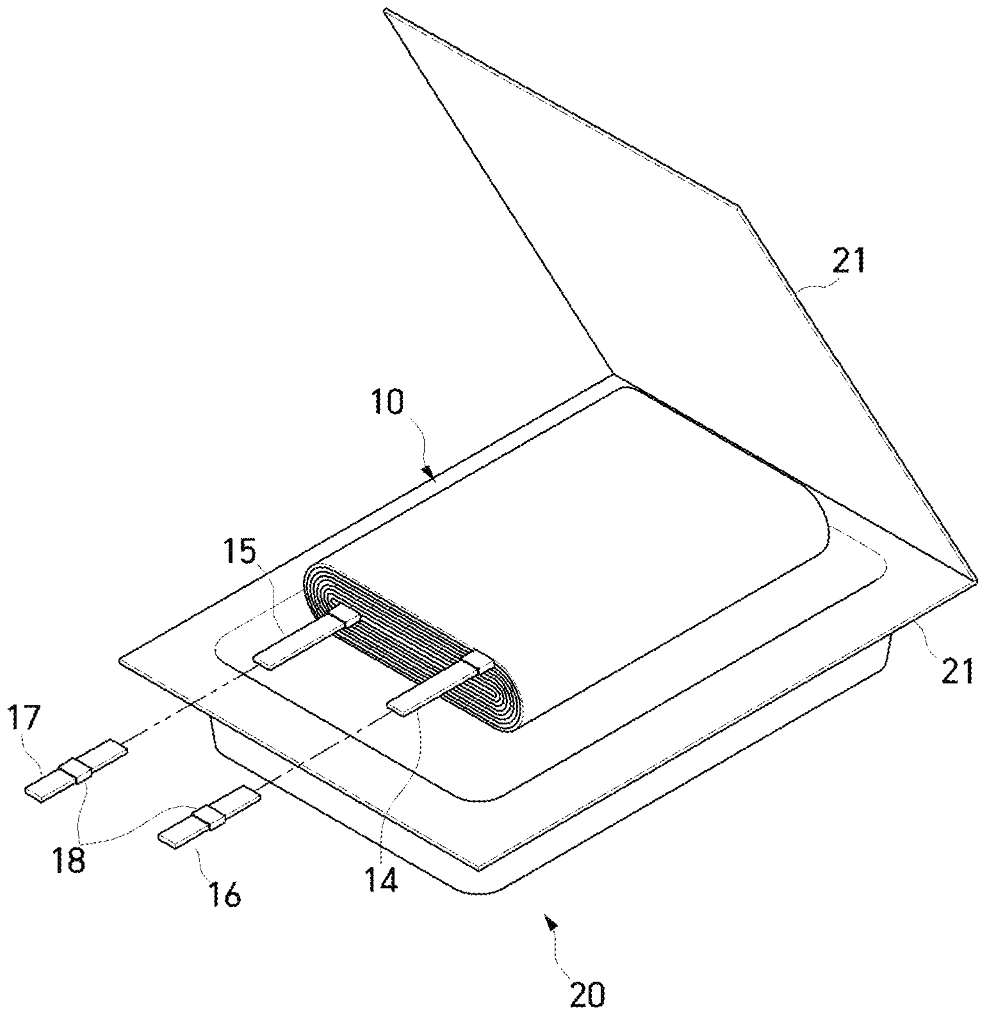
FIG. 13 is a schematic diagram of a pouch-type secondary battery to which an electrode assembly manufactured with a dried electrode plate according to embodiments of the present disclosure is applied.

FIG. 13 schematically shows a pouch-type secondary battery including an electrode assembly manufactured with a dried electrode plate according to embodiments of the present disclosure.

The pouch-type secondary battery includes an electrode assembly 10 and a pouch 20 that accommodates the electrode assembly 10.

The electrode assembly 10 is the same as the electrode assembly 10 illustrated in FIG. 1. The first electrode tab 14 and the second electrode tab 15 of the electrode assembly 10 may be electrically connected to respective external first and second terminal leads 16 and 17 by welding. Each of the first terminal lead 16 and the second terminal lead 17 may be attached with a tab film 18 for insulation from the pouch 20.

The pouch 20 may be sealed by having sealing parts 21 at the edges thereof contact each other with the electrode assembly 10 accommodated in the pouch 20. The sealing may be achieved with the tab film 18 interposed between the sealing parts 21. The sealing parts 21 of the pouch 20 may each be made of a thermal fusion material that has weak adhesion to metal. Thus, the pouch 20 may be fused by interposing the thin tab film 18 between the sealing parts 21.

Figure 14:
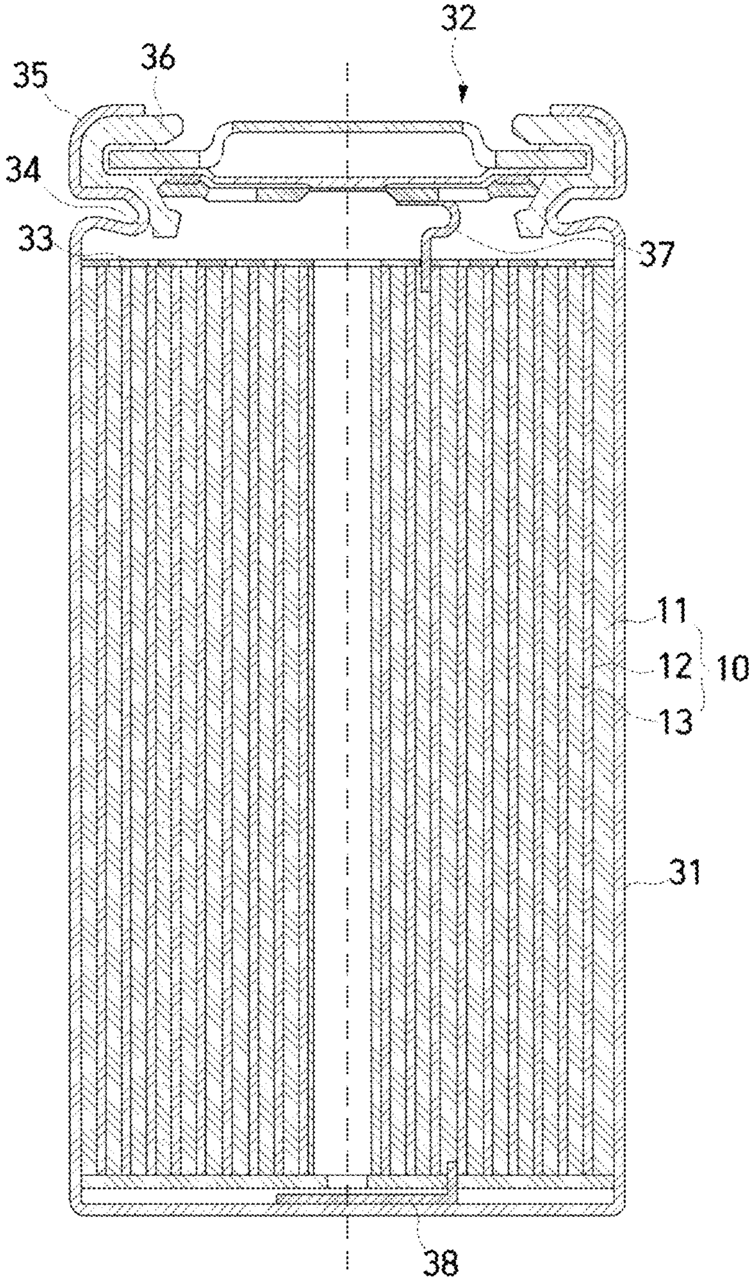
FIG. 14 is a cross-sectional view of a cylindrical secondary battery to which an electrode assembly manufactured with a dried electrode plate according to embodiments of the present disclosure is applied.

FIG. 14 is a cross-sectional view of a cylindrical secondary battery including an electrode assembly manufactured with a dried electrode plate according to embodiments of the present disclosure.

As shown in FIG. 3, a cylindrical secondary battery may include an electrode assembly 10, a case 31 accommodating the electrode assembly 10 and an electrolyte therein. A cap assembly 32 is coupled to an opening of the case 31 to seal the case 31, and an insulating plate 33 is positioned between the electrode assembly 10 and the cap assembly 32 inside the case 31.

The case 31 accommodates the electrode assembly 10 and the electrolyte, and, together with the cap assembly 31, forms the external appearance of the secondary battery. The case 31 may have a substantially cylindrical body portion 12 and a bottom portion connected to one side (e.g., to one end) of the body portion. A beading part 34 (e.g., a bead) deformed inwardly may be formed in the body portion. A crimping part 35 (e.g., a crimp) bent inwardly may be formed at an open end of the body portion.

The beading part 34 can reduce or prevent movement of the electrode assembly 10 inside the case 31 and can facilitate seating of the gasket and the cap assembly 31. The crimping part 35 may firmly fix the cap assembly 32 by pressing the edge of the case 31 against the gasket 36. The case 31 may be formed, for example, of iron plated with nickel.

The cap assembly 32 may be fixed to the inside of the crimping part 35 by a gasket 36 to seal the case 31. A first lead tab 37 extending from the electrode assembly 10 may be connected to the cap assembly 32. A second lead tab 38 extending from the electrode assembly 10 may be electrically connected to the bottom of the casing 31.

Figure 15:
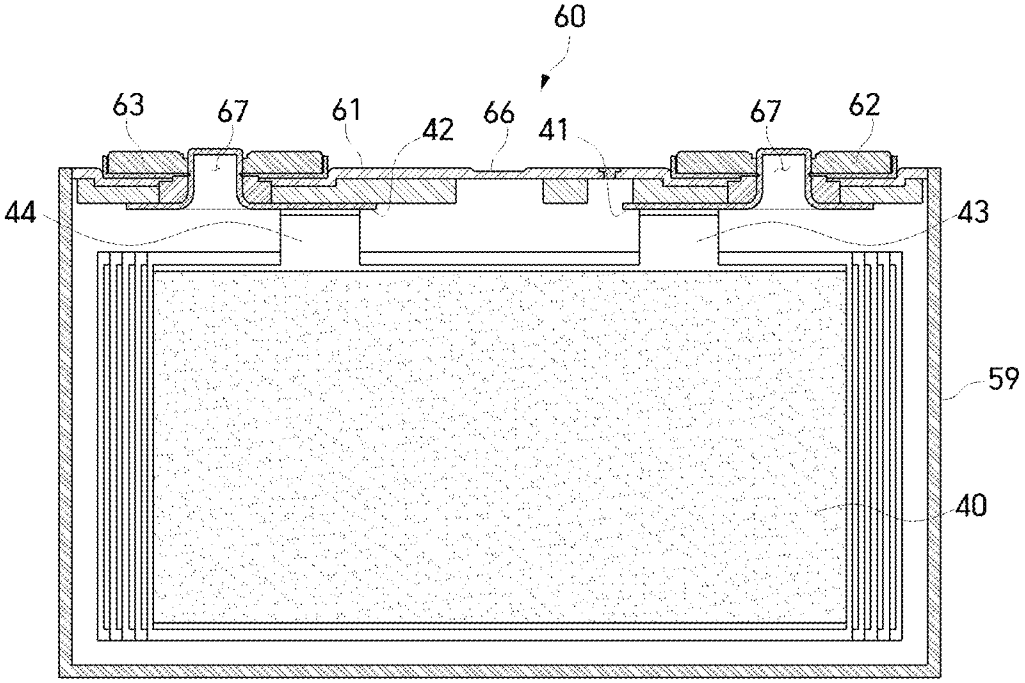
FIG. 15 is a cross-sectional view of a prismatic secondary battery to which an electrode assembly manufactured with a dried electrode plate according to embodiments of the present disclosure is applied.

FIG. 15 is a cross-sectional view of a prismatic secondary battery 60 including an electrode assembly manufactured with a dried electrode plate according to embodiments of the present disclosure.

An electrode assembly 40 of the prismatic secondary battery 60 may be formed by winding or stacking a stack of a first electrode plate, a separator, and a second electrode plate, which are formed as thin plates or films. When the electrode assembly 40 is a wound stack, a winding axis may be parallel to the longitudinal direction of the case 59. In other embodiments, the electrode assembly 40 is a stack type rather than a winding type. As such, the shape of the electrode assembly 40 is not limited in the present disclosure. In addition, the electrode assembly 40 may be a Z-stack electrode assembly in which a positive electrode plate and a negative electrode plate are provided to both sides of a separator, which is then bent into a Z-stack. In addition, one or more electrode assemblies may be stacked such that long sides of the electrode assemblies are adjacent to each other and accommodated in the case. The number of electrode assemblies in the case is not limited in the present disclosure. The first electrode plate of the electrode assembly may act as a negative electrode, and the second electrode plate may act as a positive electrode. Of course, the reverse is also possible.

The first electrode tab 43 of the first electrode plate and the second electrode tab 44 of the second electrode plate are positioned on the upper portion of the electrode assembly 40. In embodiments, the electrode assembly 40 is accommodated in a case 59 together with an electrolyte.

The first electrode tab 43 and the second electrode tab 44 may be connected to the first current collector 41 and the second current collector 42 by welding. The first current collector 41 and the second current collector 42 are respectively connected to the first terminal 62 and the second terminal 63 through a connecting member 67. In some embodiments, the outer surface of the connecting member 67 may be threaded and may be fastened to the first terminal 62 and the second terminal 63 through a screw connection. However, the present disclosure is not limited thereto, and the connecting member 67 may be connected to the first terminal 62 and the second terminal 63 by riveting or welding.

According to the present disclosure, uniform drying results can be obtained over the entire area of the electrode plate, which solves a problem of hot air being unevenly applied to the electrode plate when using a conventional drying device. As a result, the quality of the electrode plate may be improved, the manufacturing process is made safer, and there are reduced production costs.

The drying device according to embodiments of the present disclosure evenly directs hot air to achieve a uniform drying effect on the electrode plate. Therefore, flow dispersibility is secured through the present disclosure, and performance of a drying device is improved.

Although the present disclosure has been described above with respect to embodiments thereof, the present disclosure is not limited thereto. Various modifications and variations can be made thereto by those skilled in the art within the spirit of the present disclosure.

What is claimed is:

1. An apparatus for drying an electrode plate of a secondary battery, the apparatus comprising:

a hot air inlet pipe including a torsional structure positioned inside the hot air inlet pipe, the torsional structure being configured to cause rotation of hot air for drying an electrode plate coated with a secondary battery electrode material substance or a rolled electrode plate, the torsional structure comprising a fixed continuous structure having a twisted or helical geometry extending along a length of the hot air inlet pipe; and a drying duct that includes hot air ejection ports configured to direct the rotating hot air discharged from the hot air inlet pipe to the electrode plate.

2. The apparatus as claimed in claim 1, wherein the drying duct further includes a distribution plate configured to distribute the rotating hot air discharged from the hot air inlet pipe.

3. The apparatus as claimed in claim 1, further comprising a perforated plate configured to distribute the hot air ejected from the hot air ejection ports of the drying duct and direct the hot air to the electrode plate.

4. The apparatus as claimed in claim 1, wherein the torsional structure is a twisted tape comprising a continuous plate twisted along its length.

5. The apparatus as claimed in claim 4, wherein the twisted tape is formed by continuously twisting at least one plate having a width equal to a diameter of the hot air inlet pipe.

6. The apparatus as claimed in claim 5, wherein the twisted tape has a twist period of 2 to 4 times the diameter of the hot air inlet pipe and 1 to 3 twists.

7. The apparatus as claimed in claim 1, wherein the torsional structure is a helical plate comprising a continuous plate formed in a spiral shape.

8. The apparatus as claimed in claim 7, wherein the helical plate is formed in a continuous spiral by rotating at least one plate having a width equal to a radius of the hot air inlet pipe.

9. The apparatus as claimed in claim 8, wherein the helical plate has a spiral period of 1 to 4 times the diameter of the hot air inlet pipe and 1 to 5 rotations.

10. A drying duct for drying an electrode plate, the drying duct comprising:

a hot air inlet pipe including a torsional structure positioned inside the hot air inlet pipe, the torsional structure being configured to cause rotation of hot air for drying an electrode plate coated with a secondary battery electrode material substance or a rolled electrode plate, the torsional structure comprising a fixed continuous structure having a twisted or helical geometry extending along a length of the hot air inlet pipe; and hot air ejection ports configured to direct the rotating hot air discharged from the hot air inlet pipe to the electrode plate.

11. The drying duct as claimed in claim 10, wherein the torsional structure is a twisted tape comprising a continuous plate twisted along its length.

12. The drying duct as claimed in claim 11, wherein the twisted tape is formed by continuously twisting at least one plate having a width equal to a diameter of the hot air inlet pipe.

13. The drying duct as claimed in claim 12, wherein the twisted tape has a twist period of 2 to 4 times the diameter of the hot air inlet pipe and 1 to 3 twists.

14. The drying duct as claimed in claim 10, wherein the torsional structure is a helical plate comprising a continuous plate formed in a spiral shape.

15. The drying duct as claimed in claim 14, wherein the helical plate is formed in a continuous spiral by rotating at least one plate having a width equal to a radius of the hot air inlet pipe.

16. The drying duct as claimed in claim 15, wherein the helical plate has a spiral period of 1 to 4 times the diameter of the hot air inlet pipe and 1 to 5 rotations.

17. An apparatus for manufacturing an electrode plate of a secondary battery, the apparatus comprising:

a coating unit configured to coat a substrate with an electrode material substance;

a rolling unit configured to compress the electrode plate coated with the electrode material substance; and a drying unit configured to dry the electrode plate coated with the electrode material substance or the rolled electrode plate, wherein the drying unit includes a hot air inlet pipe that includes a torsional structure positioned inside the hot air inlet pipe, the torsional structure being configured to cause rotation of incoming hot air, the torsional structure comprising a fixed continuous structure having a twisted or helical geometry extending along a length of the hot air inlet pipe, and the drying unit includes hot air ejection ports configured to direct the rotating hot air discharged from the hot air inlet pipe to the electrode plate.

18. The apparatus as claimed in claim 17, wherein the drying duct further includes a distribution plate configured to distribute the rotating hot air that is discharged from the hot air inlet pipe.

19. The apparatus as claimed in claim 17, further comprising a perforated plate configured to distribute the hot air ejected from the hot air ejection ports of the drying duct and direct the hot air to the electrode plate.

* * * * *